July 2, 1963    E. T. ANGUS ETAL    3,096,467
BRUSHLESS D.C. MOTOR WITH PERMANENT MAGNET ROTOR
Filed Oct. 7, 1960
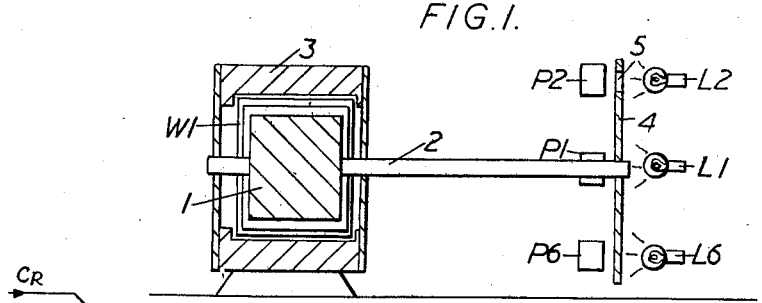
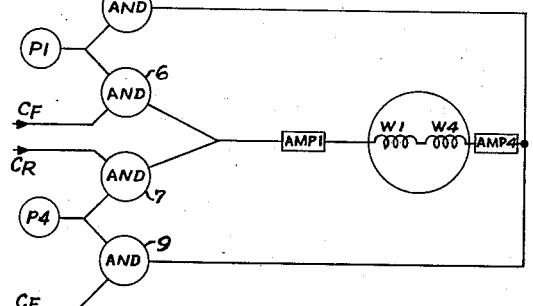
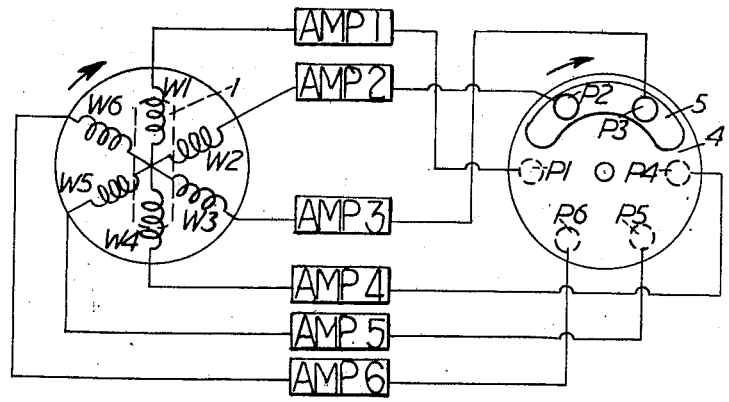
Inventors
ERNEST T. ANGUS
DONALD F. WALKER
By
Cameron, Kerkam & Sutton
Attorneys

United States Patent Office 3,096,467
Patented July 2, 1963

3,096,467
BRUSHLESS D.C. MOTOR WITH PERMANENT MAGNET ROTOR
Ernest Thomas Angus, Edinburgh, and Donald Ferguson Walker, Midlothian, Scotland, assignors to Ferranti, Limited, Lancashire, England, a company of the United Kingdom of Great Britain and Northern Ireland
Filed Oct. 7, 1960, Ser. No. 61,118
Claims priority, application Great Britain Oct. 9, 1959
4 Claims. (Cl. 318—138)

This invention relates to direct current motors.

More particularly the invention relates to direct current motors of the kind having a permanently magnetised rotor and a wound stator.

A direct current motor usually includes a commutator which suffers from well known disadvantages such as, for example, high contact resistance between the brushes and the commutator. Furthermore the sparking which is sometimes present at the commutator may be troublesome when the motor is used near electronic pulse circuits.

Accordingly it is an object of the present invention to provide a direct current motor of the kind having an unwound rotor and a wound stator in which the above disadvantages are obviated.

According to the present invention a direct current motor comprises a permanently magnetised rotor rigidly secured to an output shaft, a wound stator having a plurality of windings, each winding being associated with an individual energising circuit which is controlled by the output from at least one energy transducer, and a disc rotated in synchronism with said rotor by said output shaft, said disc controlling a supply of energy to each of said energy transducers which are disposed in relation to said disc in such manner that for any position of said rotor at least one of said stator windings is energised to produce a field causing said rotor to rotate.

The expression "energy transducer" as used herein means a device for converting energy of one kind, e.g. light energy, into electrical energy. Thus in one embodiment of the invention said energy transducers may be photo-electric cells, in which case said disc may be provided with a slot which controls the light falling on each cell from an associated light source.

One embodiment of the present invention will now be described by way of example with reference to the accompanying drawings in which:

FIGURE 1 is a schematic sectional elevation of one form of direct current motor in accordance with the invention, FIGURE 2 is a circuit diagram of the connections of the motor shown in FIGURE 1, and FIGURE 3 shows an alternative form of the connections of the parts of the motor shown in FIGURE 1.

Referring now to FIGURES 1 and 2 of the drawings a direct current motor includes a permanently magnetised rotor 1 rigidly secured to an output shaft 2 and a wound stator 3 having six windings W1 . . . W6 of which only the winding W1 is visible in FIGURE 1. Mounted on the output shaft 2 is a disc 4 having an arcuate slot 5. Six photo-electric cells P1 . . . P6 are disposed on one side of the disc 4 and six light sources L1 . . . L6 are disposed on the other side of the disc 4, only the light sources L1, L2, and L6 being shown. The six photo-electric cells P1 . . . P6 are connected to the windings W1 . . . W6 respectively through six amplifiers AMP1 . . . AMP6.

In operation of the motor the slot 5 in the disc 4 permits light to fall on either two or three of the photo-electric cells from their associated light sources according to the position of the disc 4. The outputs from the energised photo-electric cells are amplified in the respective amplifiers and utilised to energise the windings with which the photo-electric cells are associated. The position of the slot 5 with respect to the rotor 1 is chosen such that for any position of the rotor 1 a combination of the windings W1 . . . W6 is energised to produce a maximum torque on the rotor to cause the rotor to rotate in one direction. As shown in FIGURE 2, for instance, the rotor 1 (shown in broken line) is aligned with the winding W1. The slot 5 in the disc 4 is in such a position as to allow light from the light sources L2 and L3 to energise the photo-electric cells P2 and P3. The windings W2 and W3 are therefore energised and produce a resultant field perpendicular to the rotor 1 thus producing maximum torque. When the rotor has rotated through approximately thirty degrees the slot 5 permits light to fall on the photo-electric cell P4 as well as on the photo-electric cells P2 and P3. Windings W2, W3 and W4 are therefore energised and the resultant field is again perpendicular to the rotor 1 thus producing maximum torque. In a similar manner, for each rotation of approximately thirty degrees of the rotor a different combination of the photo-electric cells is energised causing the rotor 1 to rotate continuously.

The rotor 1 of the motor described above may only be rotated in a clockwise direction as indicated by the arrows in FIGURE 2. FIGURE 3, however, shows one convenient method of connecting the photo-electric cells to the windings of the stator whereby the rotor may be made to rotate in either direction. For the sake of clarity the connections to two stator windings only have been shown.

In the system shown in FIGURE 3 each of the windings W1 . . . W6 is selectively associated with two of the photo-electric cells P1 . . . P6. Thus, the photo-electric cells P1 and P4 are connected to the amplifier AMP1 associated with the winding W1 through two double-input AND gates 6 and 7, that is to say, two devices which will only give an output when both inputs are present. The second input required to operate the AND gate 6 is a forward control voltage $C_F$ and the second input required to operate the AND gate 7 is a reverse control voltage $C_R$.

The photo-electric cells P1 and P4 are also connected to the amplifier AMP4 associated with the winding W4 through a further two double-input AND gates 8 and 9. The second input required to operate the AND gate 8 is the reverse control voltage $C_R$ and the second input required to operate the AND gate 9 is the forward control voltage $C_F$.

In a similar manner, the photo-electric cells P2 and P5 are associated with the windings W2 and W5 and the photo-electric cells P3 and P6 are associated with the windings W3 and W6.

To operate the motor in a forward (clockwise) direction the forward control voltage is applied to the AND gates 6 and 9 and the four other corresponding AND gates. Any outputs from the photo-electric cells P1 and P6 will then be applied to the windings W1 . . . W6 respectively and the operation of the motor will be as described above with reference to FIGURE 2.

To operate the motor in a reverse direction the reverse control voltage is applied to the AND gates 7 and 8 and to the four other corresponding AND gates. Any outputs from the photo-electric cells P1, P2, P3, P4, P5 and P6 will then be applied to the windings W4, W5, W6, W1, W2 and W3 respectively. Therefore, with the rotor 1 and the slot 5 in the position shown in FIGURE 2 the photo-electric cells P2 and P3 are energised as before. This, however, now results in the windings W5 and W6 being energised to produce a resultant field in a direction perpendicular to the rotor 1 thus causing the rotor 1 to rotate in the reverse direction. A rotor rotation of approximately thirty degrees in the reverse direction causes the photo-electric cell P1 to become energised as well as the photo-electric cells P2 and P3. The windings W4, W5 and W6 are therefore energised and the resultant field is again perpendicular to the rotor 1 and causes it to rotate in the reverse direction. As before, each rotation of approximately thirty degrees of the rotor 1 results in a different combination of the photo-electric cells being energised thus causing the rotor to rotate continuously.

The motor described above may be modified in many ways. For example the slot 5 in the disc 4 may only permit one photo-electric cell to be energised at a time but this would result in less torque being applied to the rotor. Furthermore the photo-electric cells and the light sources may be made movable with respect to the stator windings for advancing or retarding the action of the motor. Also, there may be more or less than the six stator windings shown in the drawings and the rotor may have more than two poles, the number of photo-electric cells being adjusted accordingly.

Furthermore, other forms of energy transducer may be utilized. For example, the photo-electric cells and their associated light sources could be replaced by inductive pick-offs having primary and secondary windings, the primary winding, in operation, being energised by alternating current. In this case, the disc is made of magnetic material and so shaped as to vary the reluctance of the magnetic circuit of each pick-off according to the angular position of the disc, the resulting output from the pick-off secondary windings being rectified and applied to the associated stator windings. In this manner an output is provided by one or more of the pick-offs when the rotor is stationary, this being a necessary requirement for starting the motor.

A direct current motor of the kind described above obviates the disadvantages normally caused by a commutator, and due to the absence of any form of contact breaking there is no sparking and the motor is very suitable for use near electronic pulse circuits.

What we claim is:

1. A direct current motor comprising a permanently magnetised rotor rigidly secured to an output shaft, a wound stator having a plurality of windings, each winding being associated with an individual energising circuit which is controlled by the output current from one or other of two energy transducers, gating means for selecting one or other of said two transducers for controlling the energising circuit of each winding, and a disc rotated in synchronism with said rotor by said output shaft, said disc controlling a supply of energy to each of said energy transducers which are disposed in relation to said disc in such manner that for any position of said rotor at least one of said stator windings is energised to produce a field causing said rotor to rotate, and that said rotor is caused to rotate in a forward or a reverse direction according to which of said two energy transducers is selected by said gating means to control the energising circuit of each winding.

2. A direct current motor as claimed in claim 1 in which said energy transducers are photo-electric cells and in which said disc is provided with a slot which controls the light falling on each cell from an associated light source.

3. A direct current motor as claimed in claim 1 in which said gating means comprises first and second double input AND gates, means for applying a forward control voltage to the first input of the first gate and means for applying a reverse control voltage to the first input of the second gate, the output of one of said two energy transducers being applied to the second input of said first gate, the output of the other of said two energy transducers being applied to the second input of said second gate, and the output of said first and second gates being applied to the energising circuit of the associated winding.

4. A direct current motor as claimed in claim 1 in which said stator has an even number of windings and in which said two energy transducers are associated with the energising circuits of two windings such that each energy transducer controls the energising circuit of one winding to cause forward rotation of said rotor and controls the energising circuit of the other winding to cause reverse rotation of said rotor.

References Cited in the file of this patent

UNITED STATES PATENTS

| | | |
|---|---|---|
| 2,686,282 | Salamonovich | Aug. 10, 1954 |
| 2,919,358 | Marrison | Dec. 29, 1959 |
| 2,968,756 | Devol | Jan. 17, 1961 |